Nov. 14, 1939.　　　　G. HAMMER　　　　2,180,106
BINDER
Filed April 8, 1938　　　2 Sheets-Sheet 1
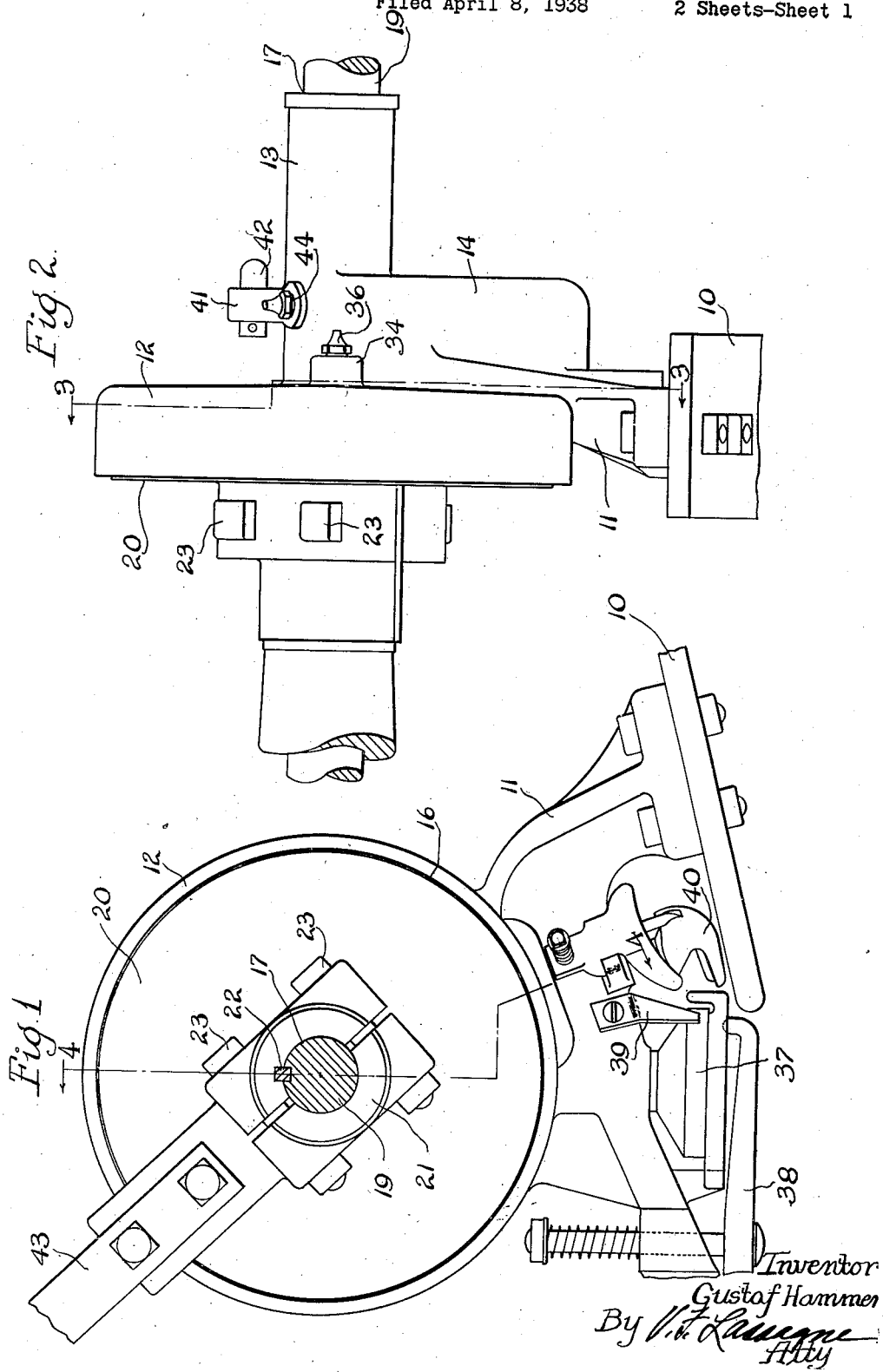

Nov. 14, 1939.  G. HAMMER  2,180,106
BINDER
Filed April 8, 1938  2 Sheets-Sheet 2
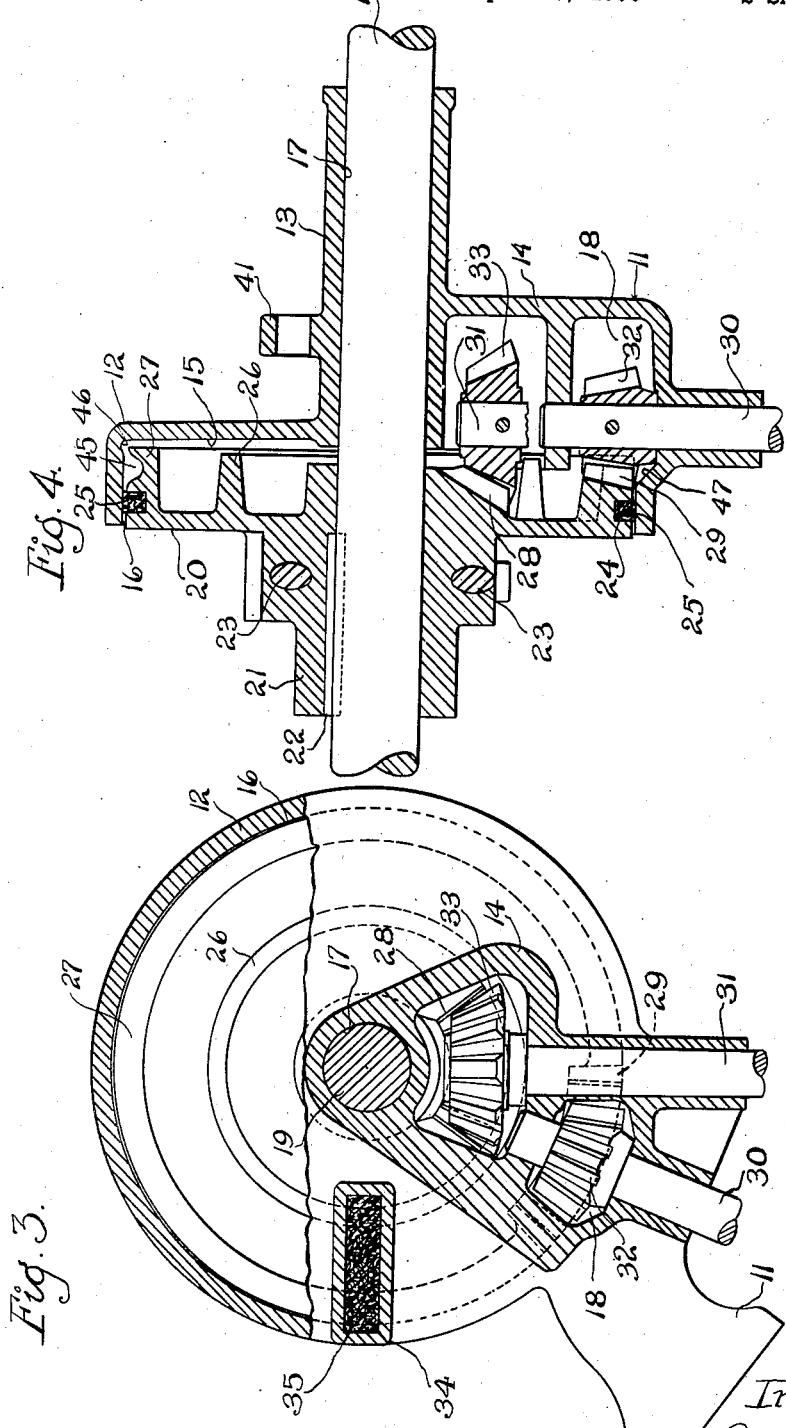
Inventor
Gustof Hammer
By V.F. Lassagne
Atty Patented Nov. 14, 1939

2,180,106

UNITED STATES PATENT OFFICE 2,180,106

BINDER

Gustaf Hammer, Chicago, Ill., assignor to International Harvester Company, a corporation of New Jersey Application April 8, 1938, Serial No. 200,851

13 Claims. (Cl. 56—432)

This invention relates to a binder for grain harvesters and the like, and more particularly to the knotter mechanism thereof.

Binders heretofore have had the disadvantage of being provided with knotter mechanisms that were not altogether free from troublesome breakdowns. The principal fault lay in the open design of the supporting structure for the mechanism utilized in driving the knotter mechanism. Ordinarily, the main knotter shaft extended through a bearing support carried on the breastplate of the binder. A compound gear secured to this shaft was utilized to drive pinions, which, in turn, actuated the knotter bill or hook shaft and the cord holder disk shaft, these and other movable parts being substantially entirely open. It is obvious that these parts were subjected to becoming clogged with dirt, rust, etc. In addition, adequate lubrication of these parts was virtually an impossibility unless continual application of small quantities of lubricant could be made. Because of these circumstances, frequent breakdowns resulted, and in time the driving parts became so worn as to necessitate replacement, resulting in loss of valuable time pending repairs and replacement.

The present invention contemplates and has for its principal object the provision of a construction in which the aforesaid problems and disadvantages are eliminated.

An important object of the invention is to provide a housing construction that supports the main knotter shaft and completely encloses the driving parts.

Another important object is to provide a housing which also serves to support other portions of the knotter mechanism.

Another object is to provide a housing adapted to contain an ample supply of lubricant for lubricating the drive parts.

Another object is to form the housing in a manner providing for adequate lubrication to all driving parts and to supply lubricant especially to the driving portions of the main driving member.

Another object is to provide the housing and driving member in a manner utilizing cooperation between the two to accommodate a sealing element therebetween for insuring an efficient seal against entrance of dirt and loss of lubricant.

Still another object is to provide an enclosed construction in which the parts are readily and easily assembled or dismantled.

And, still another object is to provide a construction combining simplicity in manufacture with unusual strength and longevity.

These and other desirable objects are achieved in one practical form of the invention wherein a preferred construction is disclosed herein in connection with a binder of the type shown and described in assignee's Patent No. 2,101,439, granted Dec. 7, 1937, reference especially being had to a knotter mechanism of the type disclosed in assignee's Patent No. 865,754, granted Sept. 10, 1907. With reference to the present disclosure, a housing having a cylindrical recess is carried by the breastplate of the binder. The main driving or knotter shaft is journaled in this housing and has secured thereto a main drive member, which is circular in form and which substantially closes the open side of the recess. The housing is thus adapted to contain lubricant, and the knotter hook pinion and the cord holder disk pinion operate in the lubricant, being driven by the main drive member. A sealing element cooperates between the housing and the drive member to provide a seal for the exclusion of dirt and the retention of lubricant.

A more complete understanding of the objects and desirable features of the invention may be had from the accompanying sheets of drawings and the detailed description disclosing the invention.

In the drawings—

Figure 1 is a side elevational view of the improved construction as mounted on the breastplate of a binder of conventional construction;

Figure 2 is an end elevational view of the same;

Figure 3 is a vertical sectional view taken on the line 3—3 of Figure 2, showing the manner of supporting the pinions; and, Figure 4 is a vertical sectional view taken at a right angle to the view in Figure 3, or substantially on the line 4—4 of Figure 1.

As previously mentioned, an improved construction is adapted for utilization in connection with any conventional type of binder, and only a portion of a binder breastplate is illustrated, as at 10. A housing structure 11 is rigidly carried by the breastplate 10, as best illustrated in Figure 1. This housing comprises generally a comparatively large cylindrical portion 12, a coaxial sleeve portion 13, and an integral box portion 14. Within the cylindrical portion 12, the housing is provided with a cylindrical recess 15, and the housing is open at one side in a manner providing a circular opening 16 substantially coincident with the cylindrical recess 15. The sleeve 13 is provided with an axial bore 17, which is open to the recess 15. The box portion 14 is hollow or recessed, as at 18, being open at one side to the recess 15.

A main driving or knotter shaft 19 is journaled in the axial bore 17 of the housing and extends substantially laterally across a portion of the binder, as is well known to those skilled in the art. A main driving member 20 is rigidly secured to the shaft 19 for rotation therewith. The member 20 is provided with a split hub 21 which cooperates with a driving key 22 and a pair of bolts 23 for securing the member to the shaft. This driving member 20 is circular in form and substantially fits the recess 15, a portion of the member being of a diameter slightly less than the circular opening 16. The member is provided with an annular groove 24 in which is disposed a circular sealing element 25, which cooperates with the inner periphery of the recess 15 to provide a seal against the entrance of dirt and the escape of lubricant which is contained in the housing 11, as enclosed by the member 20. The lubricant contained therein is, of course, also contained in the hollow portion 18 of the box portion 14 of the housing.

The inner portion of the drive member 20 is provided in the form of a compound gear having two sets of gear teeth radially and angularly spaced thereon. These sets of gear teeth comprise the inner driving portion of the member, which in general is of more or less conventional construction. This driving portion, then, consists of a pair of substantially annular cams 26 and 27 provided with mutilated gear face portions 28 and 29, respectively. These gear face portions are offset angularly with respect to each other in addition to being spaced radially on the member 20.

The box portion 14, as heretofore described, forms an integral part of the housing 12, and has journaled therein a knotter hook shaft 30 and a cord holder disk shaft 31. These shafts are disposed in the housing in angularly related position corresponding to the position of the mutilated gear faces 28 and 29. Both shafts have their inner ends extending into the recess portion 18, and the knotter hook shaft 30 has rigidly secured thereto for rotation therewith a pinion 32. This pinion 32 meshes with the gear face 29 and thus is in driving engagement with the driving member 20. The cord holder disk shaft has rigidly secured at its inner end, for rotation therewith, a pinion 33 which is also in driving engagement with the member 20, meshing with the gear face 28. Both pinions, then, are driven by the driving member 20 in a constant bath of lubricant.

To provide for further lubrication of the annular cams 26 and 27 and the gear faces 28 and 29, an additional lubricating means is carried by the housing 11. This means is in the form of an integral partially enclosed rectangular pocket 34. The open portion of the pocket faces the cylindrical recess 15 and has fitted therein a wick or pad 35. This pad is adapted to absorb lubricant and is disposed in the housing in such a position as to overlie and wipe with lubricant the cams 26 and 27 and the gear faces 28 and 29. The pocket 34 is provided at its outer portion with a lubricant fitting 36, through which additional lubricant may be supplied to the wick or pad 35. In this manner, proper and continual lubrication of the driving parts is provided for.

As hereinbefore referred to, an object of the invention is to provide a housing which serves to support other portions of the knotter mechanism. These other portions comprise generally the cord-holding disk mechanism 37, which is driven by the cord holder disk shaft 31, a tensioning means 38, also carried by the housing 11 providing for maintaining the tension on the cord-holding disk 37, which is conventional construction. Other parts of the conventional knotter mechanism are also mounted on the housing 11, among these parts being a twine-cutting knife 39 and a knotter bill or hook 40, the latter being actuated by the knotter hook shaft 30.

The housing 11 is also adapted to be connected to other supporting structure of the binder through the medium of an integral ear portion 41 on the sleeve portion 13, to which is connected a supporting rod 42.

The outer face of the driving member 20 is disposed in a radial plane substantially coincident with the radial plane in which lies the radial face of the cylindrical portion 12 of the housing surrounding the circular opening 16. The split hub 21, hereinbefore referred to, comprises part of this portion of the driving member disposed without the cylindrical recess, and rigidly carries a discharge arm 43, the purpose of which is well known to those skilled in the art.

Since the lubricant contained in the housing in the cylindrical recess 15 and in the hollow or recessed portion 18 does not necessarily reach the axial bore in the sleeve portion 13, a lubricant fitting is provided outside the housing, as at 44, for the purpose of positively lubricating the bearing surfaces between the sleeve portion 13 and the knotted shaft 17.

Additional provision is made for lubricating the drive parts by forming the driving member 20 with a second annular groove 45 adjacent and axially inwardly of the aforementioned annular groove 24. The inner periphery of the recess 15 in the housing is provided with an annular groove 46 in close proximity to the groove 45 in the member 20. At a lower portion of the housing, at the point where the knotter hook shaft is journaled, the housing is cut out, as at 47, to permit the disposition of the pinion 32 therein and to provide additional lubricant to the bearing surfaces between the shaft 30 and that portion of the box portion in which it is journaled. The cooperation between the annular grooves 45 and 46 provides a suitable oil-slinging means for maintaining the entire cylindrical recess in a constant bath of lubricant.

From the foregoing description, it will be seen that an improved construction has been provided for supporting the driving parts for a knotter mechanism, the construction including the desirable manner of supporting the parts and the adequate means for properly lubricating the same. It will also be understood that numerous modifications and alterations may be made in the preferred form of the construction illustrated and described without departing from the spirit and scope of the invention as defined in the appended claims.

What is claimed is:

1. In a binder having a breastplate and knotter mechanism, the combination of a housing carried by the breastplate and having an annular recess adapted to contain lubricant, a knotter shaft journaled in the housing and extending axially of the recess, a circular driving member secured to the shaft and lying substantially entirely within the recess, said member further including gear teeth formed on its inner face, a stub shaft journaled in the housing, and a pinion secured to the shaft within and enclosed by the housing and meshing with the gear teeth on the driving member, said stub shaft being adapted at one end to drive a portion of the knotting mechanism.

2. In a binder having a breastplate and knotter mechanism, the combination of a housing carried by the breastplate and having a circular opening and a coaxial recess therein, a knotter shaft journaled in the housing and extending axially of the recess, a circular driving member secured to the shaft and lying substantially within the recess and serving to close the aforesaid circular opening, the housing thereby being adapted to contain lubricant, said member having formed on a portion thereof within the recess two sets of gear teeth in radially spaced relation, a pair of stub shafts journaled in the housing and extending within the recess, and a pinion secured to each shaft within the recess and meshing with one of the aforesaid sets of gear teeth, each of the stub shafts being adapted at one end to drive a portion of the knotting mechanism.

3. In a binder having a breastplate and knotter mechanism, the combination of a housing carried by the breastplate and having a circular opening and a coaxial annular recess therein, a knotter shaft journaled in the housing and extending axially of the recess, a circular driving member secured to the shaft and lying substantially entirely within the recess and serving substantially to close the aforesaid opening, the housing being thereby adapted to contain lubricant, said member being formed with a peripheral groove, a circular seal disposed in the groove and cooperating therewith and with the housing to form a lubricant seal, said member including at a portion within the recess two sets of gear teeth in radially and angularly spaced relation, a pair of stub shafts journaled in the housing, and a pinion secured to each shaft within the recess and meshing with one of the aforesaid sets of gear teeth, each of the stub shafts being adapted at one end to drive a portion of the knotting mechanism, said housing serving to support other portions of the knotting mechanism.

4. In a binder having a breastplate and knotter mechanism, the combination of a housing carried by the breastplate and having an annular recess adapted to contain lubricant, a knotter shaft journaled in the housing and extending axially of the recess, a circular driving member secured to the shaft and lying substantially entirely within the recess, said member being formed with a peripheral groove, a circular seal disposed in the groove and cooperating therewith and with the housing to form a lubricant seal, said member further including two sets of gear teeth in radially and angularly spaced relation thereon, a pair of stub shafts journaled in the housing, and a pinion secured to each shaft within the recess and meshing with one of the gear teeth sets on the driving member, each of the stub shafts being adapted at one end to drive a portion of the knotting mechanism.

5. In a binder having a breastplate and knotter mechanism, the combination of a housing carried by the breastplate and serving to carry portions of the knotter mechanism, said housing being formed with a cup-shaped recess adapted to contain lubricant, one side of the housing being substantially entirely closed and having a bore therein disposed axially of the recess, the other side of the housing being provided with a circular opening coincident with the recess, a knotter shaft journaled in the housing in the aforesaid bore, a driving member secured to the shaft, said member having a circular portion substantially equal in diameter to the aforesaid circular opening, a sealing element cooperating with the housing and the member to enclose the recess, said driving member having a portion thereof lying within the enclosed recess and formed with a driving portion, and driven means journaled in the housing and having a portion engaging said driving portion within the enclosed recess to drive a portion of the knotter mechanism.

6. In a binder having a breastplate and knotter mechanism, the combination of a housing carried by the breastplate and serving to carry portions of the knotter mechanism, said housing being formed with a cup-shaped recess adapted to contain lubricant, one side of the housing being substantially entirely closed and having a bore therein disposed axially of the recess, the other side of the housing being provided with an opening alined with the recess, a knotter shaft journaled in the housing in the aforesaid bore, a driving member secured to the shaft and having a portion at one side lying within the recess and a portion at the other side cooperating with the opening in the housing to substantially enclose the recess, the first named portion of the member being formed with a driving element, and driven means journaled in the housing and having a portion lying within the enclosed recess and in driving engagement with the driving member, a portion of said driven means lying without the housing and adapted to drive a portion of the knotter mechanism.

7. In a binder having a breastplate and knotter mechanism, the combination of a housing carried by the breastplate and formed with a substantially cylindrical recess and having a coaxial circular opening at one side, the opposite side of the housing being closed and formed with an integral substantially hollow box portion, this portion being open and communicating with the aforesaid recess and both adapted to contain lubricant, a knotter shaft journaled in the housing and extending axially of the recess, a circular driving member secured to the shaft and lying substantially entirely within the recess and substantially enclosing the aforesaid circular opening, said member being formed with a peripheral groove, a seal element carried in the groove and cooperating with the inner periphery of the recess to form a lubricant seal, said member being provided with two sets of gear teeth on its face within the recess, a pair of stub shafts journaled in the box portion and extending outside thereof, a pinion secured to each shaft within the box portion and meshing with a set of gear teeth on the member and driven thereby, the outer end of each shaft being associated with a portion of the knotter mechanism, said housing serving to support other portions of the knotter mechanism.

8. In a binder having a breastplate and knotter mechanism, the combination of a housing carried by the breastplate and formed with a substantially cylindrical recess and having a coaxial circular opening at one side, the opposite side of the housing being closed and formed with an integral substantially hollow box portion, this portion being open and communicating with the aforesaid recess and both adapted to contain lubricant, a knotter shaft journaled in the housing and extending axially of the recess, a circular driving member secured to the shaft and lying substantially entirely within the recess and substantially enclosing the aforesaid circular opening, said member being formed with a peripheral groove, a seal element carried in the groove and cooperating with the inner periphery of the recess to form a lubricant seal, said member being provided with two sets of gear teeth on its face within the recess, a pair of stub shafts journaled in the box portion and extending outside thereof, a pinion secured to each shaft within the box portion and meshing with a set of gear teeth, the outer end of each shaft being associated with a portion of the knotter mechanism.

9. In a binder having a breastplate and knotter mechanism, the combination of a housing carried by the breastplate and formed with a substantially cylindrical recess and having a coaxial circular opening at one side, the opposite side of the housing being closed and formed with an integral substantially hollow box portion, this portion being open and communicating with the aforesaid recess and both adapted to contain lubricant, a knotter shaft journaled in the housing and extending axially of the recess, a circular driving member secured to the shaft and lying substantially entirely within the recess and substantially enclosing the aforesaid circular opening, a portion of said member being disposed outside the housing, said member being formed at its portion within the recess with a peripheral groove, a seal element carried in the groove and cooperating with the inner periphery of the recess to form a lubricant seal, said member being provided with two sets of gear teeth on its face within the recess, a pair of stub shafts journaled in the box portion and extending outside thereof, a pinion secured to each shaft within the box portion and meshing with a set of gear teeth, the outer end of each shaft being associated with a portion of the knotter mechanism, and a discharge arm associated in driving relation with the aforesaid outside portion of the driving member.

10. In a binder having a breastplate and knotter mechanism, the combination of a housing carried by the breastplate and being formed with a substantially cylindrical recess open at one side, the opposite side of the housing being closed and formed with an integral, substantially hollow box portion extending axially from the closed side of the housing and opening inwardly to the aforesaid recess and both adapted to contain lubricant, a knotter shaft journaled in the housing and extending axially of the recess in radially spaced relation to the box portion, a driving member secured to the shaft and lying substantially entirely within the recess and substantially enclosing the aforesaid opening, a seal element disposed between and cooperating with the housing and the member to form a lubricant seal, said member being provided with gear teeth on its face within the recess, a stub shaft journaled in the box portion and extending outside thereof, a pinion secured to said shaft within the box portion and meshing with the aforesaid gear teeth, the outer end of each shaft being associated with a portion of the knotter mechanism, the member and the gear running continuously in the lubricant in the housing.

11. In a binder having knotter mechanism, the combination of a housing formed with an opening and a recess extending inwardly thereof from the opening, a shaft journaled in the housing and extending through the opening, a driving member secured to the shaft and lying substantially entirely within the recess, said member serving to substantially close the opening for retaining lubricant within the housing, and drive means for the knotter mechanism carried by the housing and engaging the member within the recess.

12. In a binder having knotter mechanism, the combination of a housing formed with an opening and a recess extending inwardly thereof from the opening, a shaft journaled in the housing and extending through the opening, a driving member secured to the shaft and lying substantially entirely within the recess, said member serving to substantially close the opening for retaining lubricant within the housing, a seal element cooperating with the drive member and a portion of the housing surrounding the opening to form a dirt and lubricant seal, and drive means for the knotter mechanism carried by the housing and engaging the member within the recess.

13. In a binder having knotter mechanism, the combination of a housing formed with an opening and a recess extending inwardly thereof from the opening, a shaft journaled in the housing and extending through the opening, a driving member secured to the shaft and lying substantially entirely within the recess, said member serving to substantially close the opening for retaining lubricant within the housing, a discharge arm in driven relation with the member outside the housing, and knotting mechanism drive means in driven relation with the member within the housing and operating in the lubricant contained thereby.

GUSTAF HAMMER.